Dec. 29, 1964 H. S. BELSON 3,163,853

MAGNETIC STORAGE THIN FILM

Filed Feb. 20, 1958

INVENTOR.
Henry S. Belson

BY

Charles C. English
AGENT

United States Patent Office 3,163,853
Patented Dec. 29, 1964

3,163,853

MAGNETIC STORAGE THIN FILM

Henry S. Belson, Philadelphia, Pa., assignor to Sperry Rand Corporation, New York, N.Y., a corporation of Delaware Filed Feb. 20, 1958, Ser. No. 716,365
5 Claims. (Cl. 340—174)

The present invention relates to improved magnetic devices; more particularly to magnetic devices, such as magnetic memory circuits, having an improved arrangement for switching magnetic directions in a magnetic element; and is primarily concerned with a novel method and apparatus for effecting such switching quickly and at low power levels.

Various forms of magnetic storage elements are known at the present time. These known magnetic elements often take the form of a magnetic toroid, or of relatively small volumes of magnetic material comprising tapes, or layers of magnetic condensate carried by an appropriate substrate. In general, when employed in a memory application, such magnetic materials are so chosen that they exhibit a substantially rectangular hysteresis loop having two remanent states of opposite magnetic polarity whereby information of one significance may be stored in the element by causing the said magnetic material to reside at one of its said remanent states; and information of an opposite significance can be stored in the said element by causing the magnetic material to reside at the other of its said remanent states.

The storage and reading of information from such elements normally contemplates that the element is selectively flipped or switched between its aforementioned remanent states; and various techniques for effecting such switching have been suggested in the past. One such technique involves a magnetic domain wall migration process. Another method contemplated heretofore involves a domain rotational process.

The present invention contemplates the switching of a magnetic element by the application of a switching vector which is transverse to the prevaling magnetic moment in the material being switched, and which vector changes its direction. By employing such a switching technique, the present invention is capable of switching or remagnetizing a magnetic element, particularly a thin magnetic film very quickly.

It is accordingly an object of the present invention to provide a novel method and apparatus for switching or remagnetizing a magnetic element.

Another object of the present invention resides in the provision of an improved method and apparatus for switching thin magnetic films very quickly.

A further object of the present invention resides in the provision of a new and improved magnetic device that is fast in operation.

A still further object of the present invention resides in the provision of a novel method and apparatus for quickly changing a prevailing direction of magnetization in thin magnetic films at low power levels and in small switching times.

The concepts of the present invention are of particular utility in those applications wherein an extremely rapid flip of a magnetic element is desired; and the present invention finds particular utility in high speed computing applications utilizing magnetic memory stores, inasmuch as the short flip time accomplished by the present invention permits such computers to be operated at great speeds.

The improved arrangement and method of the present invention may be considered from the standpoint of the use of precessional motions in the remagnetization of a magnetic element. In particular, it has been known that when a magnetic moment is suddenly subjected to an applied magnetic field disposed at some angle other than zero to that magnetic moment, the initial impulse of the said magnetic moment is to precess about the applied field or switching vector, whereafter the said magnetic moment spirals into alignment with the switching vector. The precessional motion thus effected is normally transient in nature, and is of large angular velocity.

In accordance with the present invention, the high angular velocity of such a precessing moment is directly employed to accomplish a flip or remagnetization of a magnetic element having a prevailing magnetic moment therein; and in this respect the present invention particularly contemplates an improved remagnetization method wherein a switching vector is applied transversely to a prevailing magnetic moment, and is maintained in a transverse relationship during precessional motion of the said magnetic moment whereby the precessional motion itself is utilized to effect the flip or switching of the magnetic element. By thus utilizing the tendency of a magnetic moment to precess about a switching vector applied transversely thereto the present invention accomplishes switching of a magnetic element quickly.

As will be discussed subsequently, the actual flip time of a magnetic element wherein the magnetic moment is caused to precess in the manner aforedescribed, is inversely proportional to the magnitude of the magnetic field imposed upon the said element, i.e. the larger the applied field the shorter will be the flip time. In the case of thin magnetic films of types known heretofore and to be described hereinafter, a very large demagnetizing field may be produced; and it is in fact theoretically possible to obtain a demagnetizing field of the order of thousands of oersteds in such thin magnetic films. The present invention thus finds particular utility and is particularly directed toward utilizing precessional motions in the remagnetization of such thin magnetic films.

The foregoing objects, advantages, construction and operation of the present invention will become more readily apparent from the following description and accompanying drawings, in which.

Figure 1:
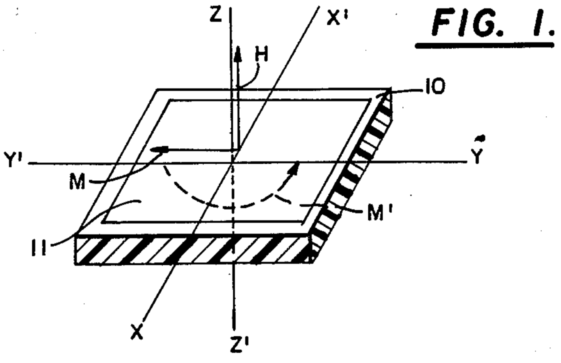
FIGURE 1 illustrates a principle used in the present invention, i.e. the imparting of a precessional motion to a magnetic element in a thin magnetic film when said element is subjected to a transverse field.

As mentioned previously, the present invention may be considered from the standpoint of the utilization of precessional motions in the remagnetization of magnetic storage elements; and in this respect the method and apparatus of the present invention can be applied to various magnetic storage elements known heretofore. The present invention, however, finds particular utility when employed in conjunction with magnetic storage elements comprising thin magnetic films exhibiting substantially rectangular hysteresis loops and which have uniaxial magnetic anisotropy in the plane of the film; and accomplishes a remagnetization of such thin magnetic films at low power levels and at high speeds. The subsequent description is accordingly particularly directed toward the method and apparatus of the present invention as applied to such thin magnetic films; and in order that the concepts of the present invention can be more fully appreciated, a very brief discussion of the nature of such thin magnetic films will now be given.

It has been suggested in the past that a magnetic storage element, exhibiting excellent information storage properties in a very small magnetic volume, may comprise a thin magnetic film carried by an appropriate substrate such as smooth glass or other insulating or dielectric material. Such a storage element may be fabricated by the deposition of magnetic material by condensation methods under high vacuum upon an appropriate substrate. Such films may vary in thickness from a few hundred to several thousand Angstrom units, and normally comprise a single domain thickness of a nickel-iron alloy comprising approximately 83 percent nickel. In practice, such condensate films are given a magnetic anisotropy by effecting the aforementioned condensation in the presence of a magnetic field; and the resultant films are said to exhibit a "direction of easy magnetization" corresponding to the aforementioned magnetic anisotropy.

This magnetic anisotropy is normally desired to predetermine and define the initial and final positions of a magnetic moment in the said magnetic film; and flipping of such a magnetic moment between its said initial and final positions, related to the aforementioned direction of magnetic anisotropy, can be accomplished by appropriate conductors disposed adjacent to and in insulated relation with the magnetic film. Various forms of such conductors have been suggested in the past, and typical such forms may comprise printed circuit conductors carried by an appropriate insulating layer disposed adjacent the magnetic film, it being understood that the words "printed circuit conductors" contemplate various known techniques for forming such conductors, such as etching, deposition, spraying, painting, and the like. Other forms of switching conductors can also be employed, including fine wires disposed adjacent to or wound about the magnetic film and substrate in appropriate directions; and each of these forms of switching conductors or windings can be employed in accordance with the present invention.

It should further be noted that when such magnetic films are employed as a memory cell, for instance in a magnetic memory matrix of such films, various conductors accomplishing different control functions can be utilized in conjunction with each such film. Such conductors may, for instance, act as drive windings associated with different orientations of the array, whereby the overall system acts as a coincident current memory. In addition, other conductors may act as switch inhibition elements, as bias elements, and the like; and while the subsequent description does not discuss such components in detail, it must be understood that the concepts of the present invention include all such structures, when requirements of an overall control or memory arrangement dictate that such other elements be present. An example of such a memory arrangement using films is described in the article by Pohm and Rubens in Proceedings of the Eastern Joint Computer Conference, December 10–12, 1956, A.I.E.E., at page 120. This invention may also be used in various other types of magnetic devices and circuits.

Precessional concepts upon which a theory of the present invention is based will be easily appreciated by examination of FIGURE 1. Thus, referring to FIGURE 1, a magnetic element is shown (a magnetic film 11 on a substrate 10), which exhibits uniaxial magnetic anisotropy along the axis Y–Y′, and has its magnetic moment M initially disposed in the Y′ direction. This element may be switched by precessional motions in the manner to be described, if for the moment we neglect demagnetizing effects, and magnetic lesses, with the understanding that we may not do so in a real physical situation. In particular, if a large field H should suddenly be applied in the direction Z normal to the X-Y plane, the first impulse of the magnetic moment vector is to precess about the applied field; and said moment M will move through a path (shown by the broken line M′) lying in the X-Y plane throughout the switching, until said moment lies in the Y direction whereby the switch has bee accomplished.

The angular velocity of this precessional motion is: $\omega=\gamma H$, where $\omega$ is the angular velocity of precession; H is the applied switching field measured in oersteds; and $\gamma$ is a constant equal to $2.8(2\pi)\times 10^6$ radians/oersted. If we should let $$\omega=\frac{2\pi}{t\times 10^{-6}}$$

where $t$ is equal to the period in microseconds, then the equation $\omega=\gamma H$ reduces to:

$$\frac{1}{t}=2.8H$$

Examining the equation $$\frac{1}{t}=2.8H$$

we find that the switching time for a magnetic element utilizing the precessional motions defined above would be approximately $t/2$ for the case of ½ revolution; and we further observe that the more the switching field is increased the smaller will be the flipping time. The previous discussion is idealized since it neglects demagnetizating fields which are present in physical situations. The magnetic moment, however, responds to either applied magnetic fields, or demagnetizing fields or a combination of these. The equation $$\frac{1}{t}=2.8H$$

predicts that, with applied fields of the order of one oersted, which are available in computer applications, the flipping time will be of the order of a large fraction of a microsecond. To get appreciable increases in speed (for example, in theory, in the realm of millimicroseconds) the present invention takes advantage of a large demagnetizing field that may be produced.

Figure 2A:
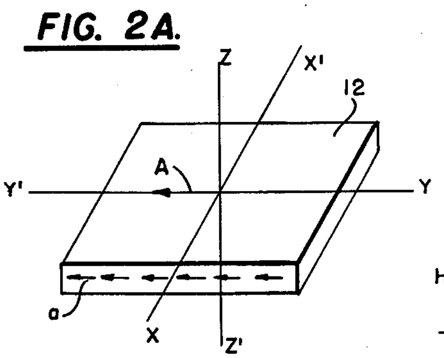
FIGURES 2A and 2B illustrate a method of remagnetization that embodies the present invention, as applied to the switching of a thin magnetic film.

As mentioned previously, a very large field may be made available in a demagnetizing field transverse to the plane of thin magnetic films such as have been described; and accordingly, the precessional flips accomplished by the present invention find particular utility when employed in such thin magnetic film applications, inasmuch as very short flip times, i.e. flip times theoretically of the order of millimicroseconds for instance, can be effected. The actual mechanism by which such precessional motions can be employed in the remagnetization of thin films will become more readily apparent by examination of FIGURES 2A and 2B.

Figure 2B:
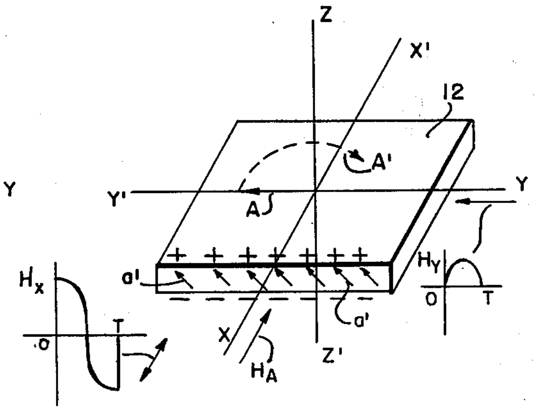

Thus, referring to these figures, it will be seen that a thin film 12 may be considered as disposed in a plane X-Y, and the said thin film may have a direction of easy magnetization disposed parallel to the Y axis of the aforementioned plane. A magnetic moment A may also be located in the film 12, for example along the aforementioned Y axis. One may also imagine in the visible edge of the film or sample 12 a series of elementary magnets or dipoles $a$. Referring now to FIGURE 2B, it will be seen that, if a magnetic field $H_a$ should suddenly be applied to film 12 in a direction parallel to the X axis and substantially 90 degrees to the direction of the magnetic moment A in the X-Y plane, the aforementioned elementary dipoles $a$ will tend to precess about the direction of the applied field $H_a$ to positions such as $a'$. This precession rotates the said elementary dipoles $a$ in the Y-Z plane thereby giving rise to a strong demagnetizing field in the Z′ direction; and the demagnetizing field tends to act in the opposite direction from the magnetic moment. This demagnetizing field, effected by precession of the elementary dipoles $a$, is disposed in the Y-Z plane with an effective component orthogonal to the magnetic moment A. This demagnetizing field changes from a small to a large value when $H_a$ is applied, because the number of free magnetic poles which tend to produce this field changes from a few transverse to an edge of the thin film to very many when oriented transverse to the plane of the film. By reason of the large demagnetizing field in the said Z′ direction, the magnetic moment A will tend to precess about this demagnetizing field along the path A′ in the X-Y plane.

Thus, by applying a field suddenly in a direction 90 degrees to the magnetic moment in the thin film, and substantially coplanar with that thin film, the magnetic moment in the said film tends to precess about a demagnetizing field which is produced in a direction transverse to the plane of the thin film. In the case of thin films such as have been described, therefore, two simultaneous precessional motions occur; the first of these motions being related to the applied field, thereby to produce a demagnetizing field; and the second of these precessional motions being related to movement of the magnetic moment in the plane of the film itself about this demagnetizing field.

In practice, the two types of precession take place simultaneously; and therefore in order to obtain optimum speed of switching, the resultant applied field $H_a$ should lead the precessing magnetic moment A by 90 degrees in the X-Y plane of the film 12. This leading relationship of the applied field to the precessing magnetic moment is accomplished by subjecting the film to two pulse type fields disposed transverse to one another. Certain optimum operational characteristics like torque and speed may be attained by varying these fields with respect to one another in accordance with sine and cosine relationships, respectively.

In particular, referring to FIGURE 2B, it will be noted that two transverse fields designated $H_x$ and $H_y$ have been illustrated, the vector sum of these being $H_a$, i.e. the applied field (switching vector). The field $H_x$ varies in accordance with a cosine function, while the field $H_y$ varies in accordance with a sine function. The actual period of the applied fields has been designated in FIGURE 2B as T, wherein T is ideally the flip time of the magnetic moment A in the sample 12.

The resultant of these fields $H_x$ and $H_y$ is, as mentioned, a continuously rotating field $H_a$. The method of flipping described in reference to FIGURE 2B is characterized by an initial flipping field $H_x$ whose peak value is applied suddenly at substantially right angles to the initial direction of the magnetic moment. This peak value of the field $H_x$ is applied prior to the application of the peak value of a second field $H_y$ that is antiparallel to the initial direction of the magnetic moment.

The resultant field $H_a$ is a vector that produces the switching or remagnetization action. Due to its rotation, this vector $H_a$ is kept substantially orthogonal to the magnetic moment as the latter rotates from its initial position. Therefore, a maximum effective torque continues to be applied to that moment as the latter is rotated. An analysis of the invention from the precessional aspect of operation indicates that high remagnetization speeds may be attained by providing a rotating field $H_a$ transverse to the rotating moment. That is, as the moment rotates, there is a continuing precession of the elementary magnetic dipoles around $H_a$, which precession produces and maintains a large demagnetizing field orthogonal to the plane of the film. The large demagnetizing field, in turn, produces a further precession of the magnetic moment around the Z axis in the plane of the film, which further precession follows, in effect, the rotating field $H_a$. Thus, the rotation of the magnetic moment is produced largely by a precessional effect and, therefore, at high speed.

For some purposes, it may not be necessary to provide the optimum speed of remagnetization afforded by a continuous and uniform rotating field that is the resultant of two fields varying in amplitude in accordance with sine and cosine functions, respectively. For example, for some purposes almost as good results may be achieved (perhaps, with simpler equipment) by a resultant field that only approximates that of such a continuous and uniform rotating field. In general, a magnetic device in accordance with this invention incorporates a remagnetization means for producing a resultant switching vector that varies in direction. This switching vector is the resultant of a plurality of component magnetic fields that vary in amplitude during the time of remagnetization. The peak amplitudes of these component fields occur at different times. Thus, the switching fields $H_x$ and $H_y$ of FIGURE 2B may be described as momentary fields that have components respectively orthogonal and antiparallel to an initial direction of magnetization of the film, and the peak amplitude of the orthogonal component occurs prior to that of the antiparallel field.

It will be understood by those skilled in the art that various circuits can be employed to accomplish the precessional flips described in reference to FIGURES 1 and 2; and various circuits will be suggested to those skilled in the art for producing transverse fields varying in accordance with sine and cosine relationships respectively, thereby to effect a switching vector which always leads the precessing magnetic moment by substantially 90 degrees in the plane of the sample being switched.

Figures 3, 4:
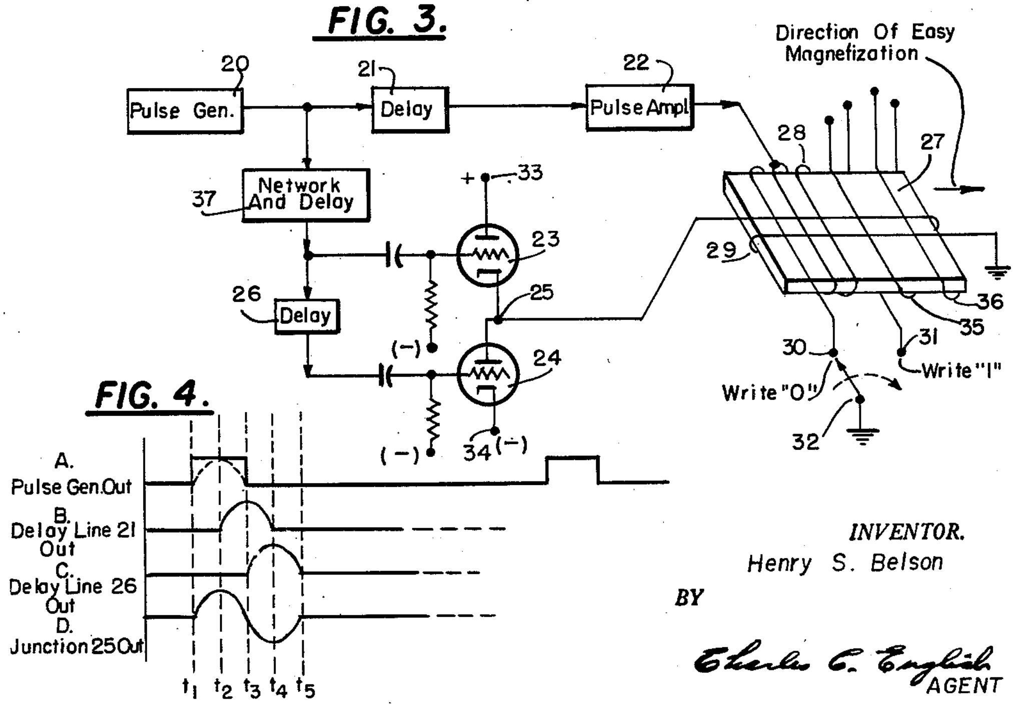
FIGURE 3 is an illustrative schematic diagram of one form of apparatus embodying this invention which may be employed in the switching of a thin magnetic film.
FIGURE 4 (A through D) are waveforms illustrating the operation of the circuit shown in FIGURE 3.

One such possible circuit is shown in FIGURE 3, but it must be emphasized that the method of the present invention may be practiced by circuits other than those particularly illustrated in FIGURE 3. Referring now to FIGURE 3, it will be seen that transversely disposed fields of substantially sine and cosine form, as discussed in reference to FIGURE 2B, can be effected by an arrangement employing a pulse generator 20 adapted to produce spaced, regularly or selectively occurring, pulses of substantially square configuration (see FIGURE 4A). The pulses from generator 20 at high frequencies may approach a sinusoidal shape as shown in broken line in FIGURE 4A. The output of pulse generator 20 is coupled via a delay line 21 to a pulse amplifier 22; and delay line 21 is chosen to exhibit a delay equal ideally to one half the width of pulses produced by pulse generator 20 (see FIGURE 4B). The output of pulse generator 20 is also applied to the control grid of a vacuum tube 23 having its anode coupled to a source 33 of positive potential; and the cathode of vacuum tube 23 is in turn coupled to the anode of a further vacuum tube 24 at a junction 25. The output of pulse generator 20 is also coupled via a delay line 26 exhibiting a delay equal to the width of pulses produced by generator 20 (see FIGURE 4C); and the pulses delayed by delay line 26 are thereafter coupled to the control grid of the aforementioned vacuum tube 24. The cathode of vacuum tube 24 is in turn coupled to a source 34 of negative potential having about the same magnitude as that of positive source 33.

The magnetic element or thin magnetic film is represented in FIGURE 3 by the element 27; and the said element carries a pair of transversely disposed windings 28 and 29 thereon. Winding 28 is in fact center-tapped; and the output of pulse amplifier 22 is coupled to this center-tap on winding 28, with the opposing ends of winding 28 being coupled respectively to two terminals 30 and 31 associated with a grounding switch 32. Terminals 30 and 31 have been respectively designated as the "write-0" and "write-1" terminals; and it will be appreciated that by moving switch 33 to one or the other of terminals 30 and 31, the direction of applied field, due to current flowing through one or the other portion of center-tapped winding 28, can be controlled, as desired. The aforementioned junction 25 is coupled to one end of winding 29, and the other end of the said winding 29 is grounded, as illustrated. It should be noted that the windings 28 and 29 have been illustrated in FIGURE 3 as comprising coils surrounding the film 27, but it should be stressed that other conductive configurations can be employed, such as the printed circuit conductors discussed previously. Other windings 35 and 36 are shown linked to magnetic element 27; and these, for example, may be those associated with inhibit and output functions of a magnetic memory.

In operation, the pulse generator 20, as mentioned previously, may produce substantially rectangular output pulses, one of which is shown in FIGURE 4A as occurring during the time interval *t1* to *t3*, and a typical such pulse may have a duration equal to, for instance 2 millimicroseconds. These pulses are fed via delay line 21 and pulse amplifier 22 to winding 28 thereby to effect a current pulse, during time interval *t2* to *t4*, through one or the other half of winding 28 depending upon the position of switch 32. The current pulse so coupled to winding 28 is illustrated in FIGURE 4B, and exhibits a substantially half-sinusoidal waveform; and, in practice, this sinusoidal form of pulse applied to winding 28 is derived simply due to the inductances and capacitances in delay line 21 and in pulse amplifier 22, with these reactive components tending to degenerate the rectangular pulse output of generator 20 into the substantially half-sinusoidal wave shown.

It will be noted that, due to the inclusion of delay line 21, the actual application of a current pulse to winding 28 is delayed by one-half the pulse width of the pulses generated by generator 20, e.g. by one millimicrosecond, whereby the current pulse in winding 28 commences at time *t2*. Immediately upon occurrence of a pulse from generator 20, however, such a pulse is applied to the grid of tube 23 thereby causing the said tube 23 to commence conduction during the time interval *t1* to *t3*. Junction 25, therefore, follows the potential excursion of pulse generator 20, during the time interval *t1* to *t3*.

The pulse output of generator 20 is, as mentioned previously, also applied to the control grid of tube 24 via delay line 26, and delay line 26 for the time periods illustrated and described, is so chosen that it exhibits a time delay of 2 millimicroseconds. Accordingly, at time *t3* (see FIGURE 4C), tube 24 is driven into conduction, by a delay pulse from delay line 26, just as the pulse applied to tube 23 (FIGURE 4A) dies out; and this conduction of tube 24 causes the potential at junction 25 to drop essentially to the potential of the cathode of tube 24, whereby junction 25 exhibits a negative-going excursion during the time *t3* to *t5* (see FIGURE 4D).

Comparing FIGURES 4B and 4D, therefore, it will be seen that the potentials occurring at the outputs of pulse amplifier 22 and at junction 25 are varying in nature; and the variations are such that the variation at the output of junction 25 leads the variation at the output of pulse amplifier 22 by 90 degrees, thereby giving the desired sine and cosine relationship between these two varying potentials. The current pulse produced at the output of amplifier 22 is, as mentioned previously, applied to a portion of winding 28, thereby to produce a field in the magnetic film 27 disposed parallel to the direction of easy magnetization of the said sample 27, whereby the field produced by winding 28 corresponds to the field $H_y$ already described in reference to FIGURE 2B. Similarly, the potential variation at junction 25 effects current flow in winding 29, thereby to produce a further field in the sample 27 transverse to the direction of easy magnetization of said sample and corresponding to the field $H_x$ already described in reference to FIGURE 2B.

The combined effect of these two transversely disposed sine and cosine fields is to cause a resultant field to be produced in the sample or film 27 which is disposed initially at substantially 90 degrees to the direction of easy magnetization of sample 27, and which leads a precessing magnetic moment in sample 27 by 90 degrees during the precession of said moment. This operation, as described previously causes the magnetic moment to assume a predetermined direction related to the direction of easy magnetization of sample 27, with the actual direction of the magnetic moment, after the orthogonally imposed fields have disappeared, being determined by which of switch contacts 30, 31 was closed by switch 32.

The waveforms in FIGURE 4 provide a switching operation that differs from the ideal in that the drive $H_x$ applied to the winding 29 during time *t1* to *t2* starts the magnetic moment A rotating before the peak $H_x$ is applied at *t2*. The ideal transverse switching drive $H_x$ may be more closely approximated by using an overcompensating high frequency network 37 (e.g. a parallel combination of resistor and capacitor, not shown) to produce a sharp leading edge to the waveform applied to the tube 23. This network 37 may also include a delay in order that this sharp leading edge occurs at substantially *t2* The delays of circuits 26 and 21 and other circuit parameters may be suitably adjusted to provide the proper time relationships and waveshapes.

The actual technique thus described corresponds to the writing of information into the sample or magnetic film 27. It will be appreciated that other windings could be associated with the sample 27 for sensing the nature of information in the said sample, as well as for operating upon the sample 27 in other manners well known in the magnetic memory field. For example, a "write-0" operation may also be used at the proper times as a "read-out" operation, in a manner well known in the art. Each of these other operations, however, when concerned with changing the direction of magnetization of the sample 27, can be accomplished through utilization of precessional moments substantially as described.

While I have thus described a preferred method and apparatus in accordance with the present invention, many variations will be suggested to those skilled in the art, and certain of these variations have already been discussed. It must therefore be emphasized that the foregoing description is meant to be illustrative only and should not be considered limitative of my invention; and all such variations and modifications as are in accord with the principles described are meant to fall within the scope of the appended claims.

Having thus described my invention, I claim:

1. In combination, a magnetic information storage element having a magnetic moment therein and a rectangular hysteresis characteristic, a pair of transversely disposed control windings linked to said element, means for applying first current pulses to one of said control windings, said first current pulses varying substantially in accordance with a sine function, and means for applying second current pulses to the other of said control windings, said second current pulses varying substantially in accordance with a cosine function relative to the variation of said first current pulses, said first and second current pulses providing a magnetic switching field for switching the direction of said magnetic moment, said magnetic field maintaining an angular relationship with said magnetic moment as said moment changes directions.

2. The combination of claim 1 including control means for selectively applying one of said first pulses and one of said second pulses to said pair of windings respectively in concurrence with one another.

3. The combination of claim 1 wherein said magnetic storage element comprises a thin magnetic film carried upon a non-magnetic substrate.

4. In combination a thin magnetic film having a rectangular hysteresis characteristic and a direction of easy magnetization, and means for remagnetizing said film comprising first means producing a first magnetic field in said film which varies in accordance with a sine function, said first field being disposed substantially parallel to said direction of easy magnetization, and second means for producing a second magnetic field in said film which varies in accordance with a cosine function, said second field being disposed transverse to said direction of easy magnetization.

5. A magnetic device comprising a thin magnetic film having two directions of substantial remanence, means for changing the direction of magnetization of said film, said means including means for applying to said film a plurality of momentary rotating magnetic fields, a first and a second one of said fields having components respectively transverse and antiparallel to an initial direction of magnetization of said film, said first fields having a peak amplitude that occurs prior to a peak amplitude of said second field.

References Cited in the file of this patent

UNITED STATES PATENTS

| | | |
|---|---|---|
| 2,811,652 | Lipkin | Oct. 29, 1957 |
| 3,030,612 | Rubens et al. | Apr. 17, 1962 |
| 3,092,812 | Rossing et al. | June 4, 1963 |

FOREIGN PATENTS

| | | |
|---|---|---|
| 592,241 | Great Britain | Sept. 11, 1947 |
| 845,604 | Great Britain | Aug. 24, 1960 |
| 845,605 | Great Britain | Aug. 24, 1960 |

OTHER REFERENCES

"Preparation of Thin Magnetic Films and Their Properties," by Blois, in Journal of Applied Physics, Vol. 26, No. 8, August 1955, pp. 975–980.

"Thin Films, Memory Elements," Electrical Manufacturing, Vol 61, No. 1, January 1958, pp. 95–98.

Abstract published June 30, 1953, 671–OG–1499.

A Compact Coincident Current Memory, by Pohm et al. Proceedings of the Eastern Joint Computer Conference. Dec. 10–12, 1956, pp. 120–123.